United States Patent
Liu et al.

(10) Patent No.: US 12,424,132 B2
(45) Date of Patent: Sep. 23, 2025

(54) DISPLAY DEVICE AND LIGHT DETECTION MODULE

(71) Applicant: CHAMP VISION DISPLAY INC., Miao-Li County (TW)

(72) Inventors: Chin-Ku Liu, Miao-Li County (TW); Chia-Hung Yu, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 164 days.

(21) Appl. No.: 18/473,307

(22) Filed: Sep. 25, 2023

(65) Prior Publication Data

US 2024/0110829 A1    Apr. 4, 2024

(30) Foreign Application Priority Data

Sep. 29, 2022  (CN) .......................... 202211196396.2

(51) Int. Cl.
*G09G 3/00*    (2006.01)

(52) U.S. Cl.
CPC ......... *G09G 3/006* (2013.01); *G09G 2330/12* (2013.01)

(58) Field of Classification Search
CPC ... G09G 3/006; G09G 2330/12; G01J 1/0266; G01J 1/0271; G01J 1/4204; G01J 1/00; G01J 1/0403; G01J 3/0278; G01J 3/0291; G01J 3/506; G01J 3/0202; G01J 3/46
See application file for complete search history.

(56) References Cited

U.S. PATENT DOCUMENTS

| | | | |
|---|---|---|---|
| 6,950,098 B2 | 9/2005 | Brabander et al. | |
| 7,894,197 B2* | 2/2011 | Hwang | G01J 1/0266 361/752 |
| 8,107,250 B2* | 1/2012 | Tseng | H04N 5/65 361/752 |
| 9,176,005 B2 | 11/2015 | Hogo et al. | |
| 10,062,338 B2 | 8/2018 | Hogo | |
| 11,763,728 B2* | 9/2023 | Kimura | G09G 3/2096 345/173 |
| 11,976,977 B2* | 5/2024 | Sim | G01J 3/506 |
| 2008/0204437 A1* | 8/2008 | Jensen | G01J 1/32 345/207 |
| 2009/0009501 A1* | 1/2009 | Shiba | G01J 1/02 345/207 |

(Continued)

FOREIGN PATENT DOCUMENTS

| CN | 101373283 | 6/2010 |
|---|---|---|
| CN | 106463074 | 2/2017 |
| CN | 105023512 | 8/2018 |

(Continued)

*Primary Examiner* — David Tung
(74) *Attorney, Agent, or Firm* — JCIPRNET (57) ABSTRACT

A display device and a light detection module are provided. The display device includes a display panel and the light detection module. The light detection module is capable of detecting an optical feature of a display surface of the display panel, and includes a shaft portion, a rod portion, and a light detector. The shaft portion has a shaft extension direction. The rod portion has a rod extension direction, and takes the shaft portion as a rotation shaft. An included angle between the rod extension direction and the shaft extension direction is between 125 degrees and 145 degrees.

16 Claims, 3 Drawing Sheets

(56) References Cited

U.S. PATENT DOCUMENTS

2012/0146973 A1\* 6/2012 Kaji ................... G02F 1/13318
　　　　　　　　　　　　　　　　　　345/207
2018/0120163 A1\* 5/2018 Su ........................ G01J 3/0291

FOREIGN PATENT DOCUMENTS

| CN | 113539063 | 10/2021 |
| TW | 202031038 | 8/2020 |
| TW | 202044224 | 12/2020 |

\* cited by examiner

DISPLAY DEVICE AND LIGHT DETECTION MODULE

CROSS-REFERENCE TO RELATED APPLICATION

This application claims the priority benefit of China application serial no. 202211196396.2, filed on Sep. 29, 2022. The entirety of the above-mentioned patent application is hereby incorporated by reference herein and made a part of this specification.

BACKGROUND

Technical Field

The disclosure relates to an electronic device and an optical module, and in particular relates to a display device and a light detection module.

Description of Related Art

In recent years, with the advancement of science and technology, the production technology of images has become more and more refined. These images are vividly presented on the display device by multimedia videos, web pages, digital photos, games, etc. However, if the display colors of the display device is not optimized, the displayed image is prone to color unbalance, dull color, color distortion, etc., resulting in poor visual perception. Therefore, with the assistance of a detection and calibration colorimeter module, the display device may present the best display effect with a standard color gamut, so as to meet the different color requirements and display effects of the creator.

Existing detection and calibration colorimeter modules are all detected and calibrated through the built-in settings of a microcontroller unit (MCU), a computer or the motherboard of the module itself. For example, the built-in settings may be factory-set pre-calibration program stored in the processing unit (MCU). After comparing the detection value obtained by the detection and calibration colorimeter module with the value in the pre-calibration program, calibration is performed. However, when performing detection in the prior art, it is necessary to automatically or manually attach the sensor to the display screen, rotate the sensor disposed on the frame horizontally to the display area, or use the edge of the frame as the rotation axis to turn the sensor over to the display area, so that the sensor is close to (i.e., face) the display area of the display screen, and thereafter the detection and calibration are performed. However, in the prior art, the position of the detection and calibration colorimeter module is likely to be incorrect or the detection and calibration colorimeter module is unable to be close to the display surface, resulting in inaccurate detection or calibration. Alternatively, the detection position is too close to the boundary of the display surface to detect and calibrate the display area mainly viewed by the user (e.g., near the central area of the display surface), resulting in inaccurate detection or calibration.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a display device with good screen quality.

The disclosure provides a light detection module with good reliability.

In order to achieve one of, or portions of, or all of the above objectives or other objectives, an embodiment of the disclosure provides a display device. The display device includes a display panel and a light detection module. The display panel has a display surface. The light detection module may be used to detect an optical feature of the display surface. The light detection module has a first mode and a second mode, and includes a shaft portion, a rod portion, and a light detector. The shaft portion has a shaft extension direction. The rod portion has a rod extension direction. The rod portion has a connection end portion and a detection end portion. The connection end portion is fixed on the shaft portion, and takes the shaft portion as a rotation shaft. The light detector is located on the detection end portion of the rod, the light detector has a detection surface. The light detector is located on the detection end portion of the rod portion, in which the light detector has a detection surface. When the light detection module is in the first mode, the detection surface of the light detector is located at a first position, and the detection surface faces away from the display surface. When the light detection module is in the second mode, the detection surface of the light detector is located at a second position, and the detection surface faces the display surface. An included angle between the rod extension direction and the shaft extension direction is an obtuse angle.

In order to achieve one of, or portions of, or all of the above objectives or other objectives, an embodiment of the disclosure provides a light detection module. The light detection module includes a shaft portion, a rod portion, and a light detector. The shaft portion has a shaft extension direction. The rod portion has a rod extension direction. The rod portion has a connection end portion and a detection end portion. The connection end portion is fixed on the shaft portion, and takes the shaft portion as a rotation shaft. The light detector is located on the detection end portion of the rod portion, in which the light detector has a detection surface. An included angle between the rod extension direction and the shaft extension direction is an obtuse angle.

Based on the above, in the display device and the light detection module according to an embodiment of the disclosure, through the structural configuration of the shaft portion and the rod portion of the light detection module, the light detection module may be integrated on the display device by switching between the first mode and the second mode, so that the user may detect the image screen of the display device according to the actual requirements. In addition, by disposing the light detection module on the frame of the display device, and by switching between the first mode and the second mode, the rod portion of the light detection module is swept above the display surface of the display device to change the included angle between the rod extension direction of the rod portion and the boundary with the display surface. Therefore when the light detection module is in the first mode, the display surface of the display device is not shielded, and viewing is not affected, and when the light detection module is in the second mode, the central area of the display surface that is relatively far away from the frame of the display device may be detected based on the length of the rod, so that the accuracy of the light detection module may be further improved. In addition, the light detection module has a simple structure, so that the cost is low, and the thickness of the display device is not affected, which is beneficial to the design of a thin display device.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWING

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
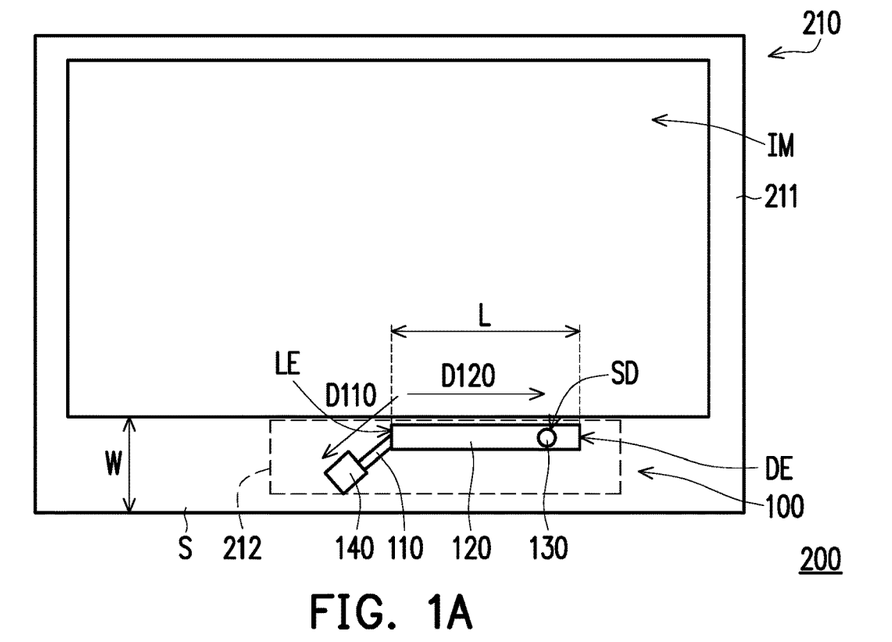
FIG. 1A is a front schematic view of a light detection module of a display device in a first mode according to an embodiment of the disclosure.
Figure 1B:
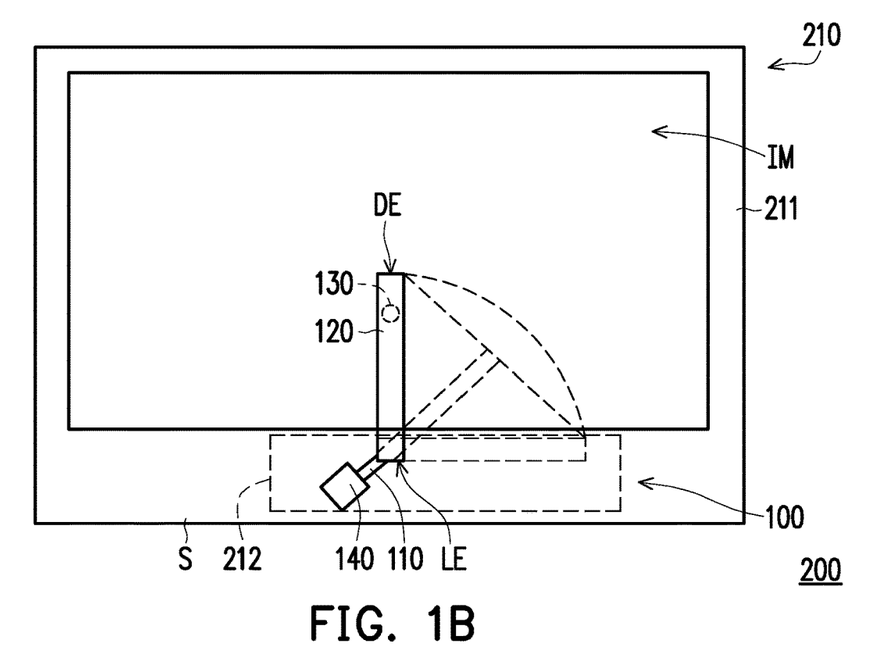
FIG. 1B is a front schematic view of the light detection module of the display device of FIG. 1A in a second mode.

FIG. 1A is a front schematic view of a light detection module of a display device in a first mode according to an embodiment of the disclosure. FIG. 1B is a front schematic view of the light detection module of the display device of FIG. 1A in a second mode. Referring to FIG. 1A and FIG. 1B, in this embodiment, a display device 200 includes a display panel 210 and a light detection module 100. The display panel 210 has a display surface IM, a light detector 130 has a detection surface SD, the light detector 130 may be a video camera, a photographic camera, or the like, which adopts a charge coupled device (CCD) or a complementary metal oxide semiconductor transistors (CMOS). The light detection module 100 may be used to detect the optical features of the display surface IM (i.e., a display light beam provided by the display surface IM enters the light detection module 100 via the detection surface SD). For example, the optical feature may be the chromaticity or luminance of the display light beam provided by the display surface IM, but the disclosure is not limited thereto.

Specifically, as shown in FIG. 1A and FIG. 1B, in this embodiment, the light detection module 100 includes a shaft portion 110, a rod portion 120, and a light detector 130. The shaft portion 110 and the rod portion 120 form an obtuse angle, the obtuse angle is, for example, greater than 90 degrees and less than 180 degrees, preferably greater than or equal to 125 degrees and less than or equal to 165 degrees, and optimally greater than or equal to 125 degrees and less than or equal to 145 degrees. Furthermore, the shaft portion 110 has a shaft extension direction D110, and the rod portion 120 has a rod extension direction D120 (for example, the connection part between the shaft portion 110 and the rod portion 120 is taken as a starting point). The included angle between the rod extension direction D120 and the shaft extension direction D110 is an obtuse angle, for example, greater than or equal to 125 degrees and less than or equal to 145 degrees, preferably 135 degrees. Moreover, in this embodiment, the rod portion 120 has a connection end portion LE and a detection end portion DE, the connection end portion LE is fixed on the shaft portion 110, and the shaft portion 110 is taken as the rotation shaft of the rod portion 120 (i.e., there is no relative rotation between the rod portion 120 and the shaft portion 110), the rod extension direction D120 is, for example, the direction in which the connection end portion LE towards the detection end portion DE. The light detector 130 is located on the detection end portion DE of the rod portion 120. In other embodiments, the shaft portion 110 is, for example, a single rod, and the rod portion 120 is, for example, a single rod.

On the other hand, as shown in FIG. 1A and FIG. 1B, the display device 200 has a frame 211. For example, the frame 211 has four side portions S which surround the display surface IM. In other embodiments, such as a narrow bezel display (or bezel-less display), the frame 211 may have only one side portion. In this embodiment, the shaft portion 110 is located at one side portion S of the frame 211 of the display device 200, and the side portion S has a frame width W. Here, the frame width W is the width of the side portion S, on which the shaft portion 110 is disposed, in the direction perpendicular to the boundary of the display surface IM (the boundary between the display surface IM and the side portion S) and parallel to the display surface IM (as shown in FIG. 1A). Furthermore, in this embodiment, the width of the rod portion 120 (e.g., the length of the rod portion 120 in the direction perpendicular to the rod extension direction D120) is smaller than the frame width W, and the length L of the rod portion 120 (e.g., the length of the rod portion 120 in the rod extension direction D120) is greater than the frame width W. For example, in this embodiment, the length L of the rod portion 120 is greater than 2 times to 5 times the frame width W. In particular, when the included angle between the rod extension direction D120 and the shaft extension direction D110 is greater than 90 degrees and less than 125 degrees, the required frame width W of the frame 211 increase, and when the light detector 130 is located at the position where the display surface IM is detected (i.e., the second position), due to the rod portion 120 and the boundary of the display surface IM form an obtuse angle, the light detector 130 is less able to reach further into the central area of the display surface IM; when the included angle between the rod extension direction D120 and the shaft extension direction D110 is greater than 145 degrees and less than 180 degrees, the included angle between the shaft extension direction D110 and the boundary is reduced, which facilitates reducing the frame width W or disposing a larger driving device to drive the shaft portion 110, but the light detector 130 is less able to reach further into the central area of the display surface IM, and the length of the rod portion 120 needs to be appropriately extended; when the angle between the rod extension direction D120 and the shaft extension direction D110 is equal to 180 degrees (or close to 180 degrees), the light detector 130 cannot enter the range of the display surface IM (or the position of the light detector 130 cannot reach further into the central area of the display surface IM). In general, when the included angle between the rod extension direction D120 and the shaft extension direction D110 is an obtuse angle, the shaft portion 110 may be rotated to drive the light detector 130 disposed on the rod portion 120 to enter the range of the display surface IM, thereby the optical feature of the display surface IM is detected.

Further, as shown in FIG. 1A and FIG. 1B, in this embodiment, the frame 211 may include an accommodating recess 212 for accommodating the rod portion 120. Moreover, when the rod portion 120 is disposed in the accommodating recess 212 (as shown in FIG. 1A), the outer surface of the frame 211 may be coplanar with the outer surface of the rod portion 120 (i.e., the frame 211 does not cover the rod portion 120, and the light detector 130 is not shielded by other objects), and disposed in the accommodating recess 212 of the display device 200, but the disclosure is not limited thereto. In other embodiments, the frame 211 may not include the accommodating recess 212, as long as an engaging member is included, it may be used to install the shaft portion 110. Such that, when the shaft portion 110 is installed on the frame 211, the rod portion 120 is located on the surface of the frame 211.

Furthermore, as shown in FIG. 1A and FIG. 1B, in this embodiment, the light detection module 100 has a first mode and a second mode, may detect light from different sources according to requirements, and may not hinder the user from viewing the display device 200 when idle. For example, as shown in FIG. 1A, in this embodiment, when the light detection module 100 is in the first mode, the detection surface SD of the light detector 130 is located at the first position, and the detection surface SD faces away from the display surface IM (e.g., the display surface IM and the detection surface SD are toward the same direction). The first position is, for example, located within the range of the side portion S of the frame 211. In this way, when the light detection module 100 is in the first mode, since the detection surface SD faces the external environment, the light detection module 100 may enable the light detector 130 to detect ambient light. In addition, as shown in FIG. 1A, when the light detection module 100 is in the first mode, the position of the rod portion 120 falls within the range of the side portion S of the frame 211, and the rod extension direction D120 is parallel to the border of the display surface IM closest to the rod portion 120, so that the light detection module 100 does not shield the display surface IM of the display device 200, and does not affect viewing.

On the other hand, when the light detector 130 of the light detection module 100 is to be used to detect the optical features (e.g., chromaticity) of the display image of the display device 200, the shaft portion 110 of the light detection module 100 may be rotated to switch the light detection module 100 from the first mode to the second mode. Furthermore, as shown in FIG. 1B, when the shaft portion 110 of the light detection module 100 rotates, the rod portion 120 rotates with the shaft portion 110 as the rotation shaft, and the track surface formed by sweeping the rod portion 120 is a portion of a cone surface. Furthermore, as shown in FIG. 1B, when the light detection module 100 is in the second mode, the detection surface SD of the light detector 130 is located at the second position, and the detection surface SD faces the display surface IM. The second position is, for example, located within the range of the display surface IM. In this way, the light detection module 100 may enable the light detector 130 to detect the display light beam provided by the display surface IM, and thereby detect the optical features of the display image of the display device 200.

In addition, as shown in FIG. 1A and FIG. 1B, when the light detection module 100 is in the first mode and the second mode, the shaft extension direction D110 (the shaft portion 110) remains parallel to the display surface IM, but when the light detection module 100 is in the first mode, the rod extension direction D120 is parallel to the border of the display surface IM closest to the rod portion 120 (e.g., the included angle is between −10 degrees and 10 degrees). When the light detection module 100 is switched to the second mode, the included angle between the rod extension direction D120 and the boundary of the display surface IM is, for example, between 75 degrees and 105 degrees, preferably the rod extension direction D120 is perpendicular to the boundary of the display surface IM. Moreover, in this embodiment, the minimum distance from the second position to the boundary of the display surface IM is greater than the minimum distance from the first position to the boundary of the display surface IM (e.g., greater than 1.5 times and less than 10 times). In this way, when the light detection module 100 is in the first mode, the display surface IM of the display device 200 is not shielded by the light detection module 100, and viewing is not affected. When the light detection module 100 is in the second mode, the central area of the display surface IM that is relatively far away from the frame 211 of the display device 200 may also be detected based on the length L of the rod portion 120. In this way, the accuracy of the light detection module 100 may be further improved.

As shown in FIG. 1A, in this embodiment, the light detection module 100 may drive the shaft portion 110 of the light detection module 100 to rotate by actuating portions 140, so that the light detection module 100 may switch between the first mode and the second mode. Further explanation is given below with reference to FIG. 2A to FIG. 2E.

Figure 2A:
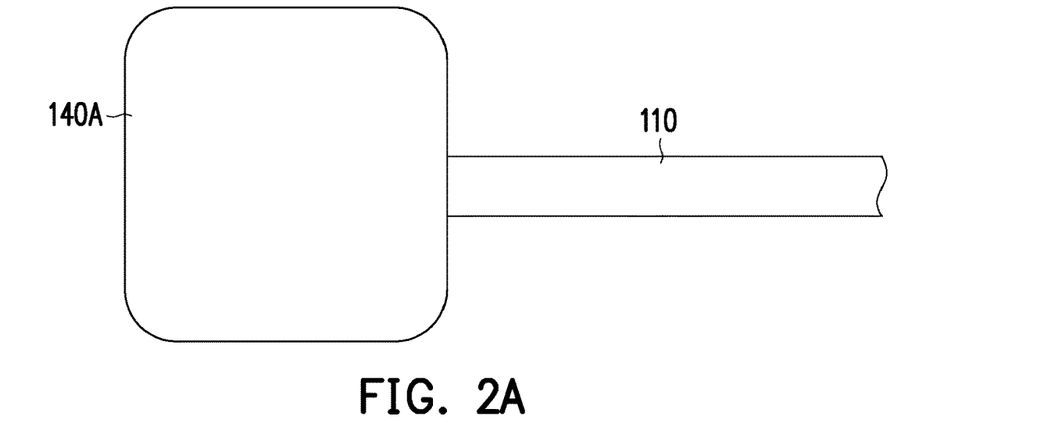
FIG. 2A is a schematic view of an actuating portion of the light detection module of FIG. 1A.
Figure 2B:
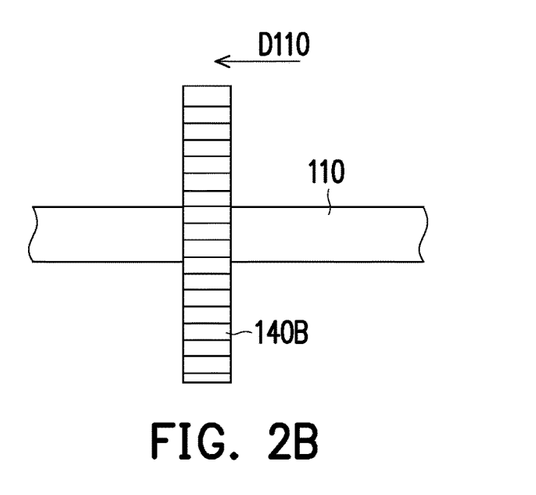
FIG. 2B and FIG. 2C are a side schematic view and a front schematic view of another actuating portion of the light detection module of FIG. 1A.
Figure 2C:
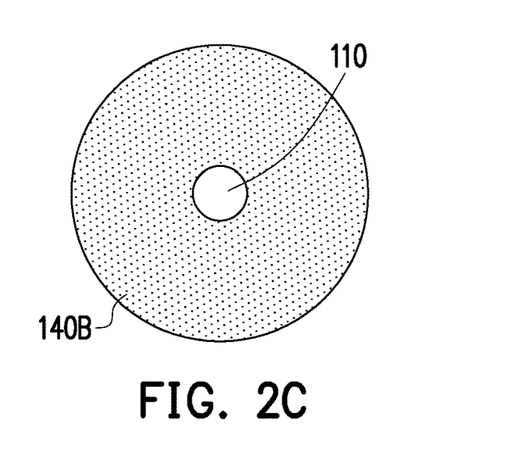
Figure 2D:
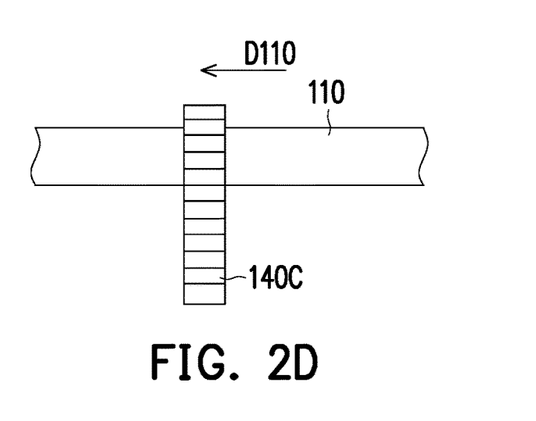
FIG. 2D and FIG. 2E are a side schematic view and a front schematic view of another actuating portion of the light detection module of FIG. 1A.
Figure 2E:
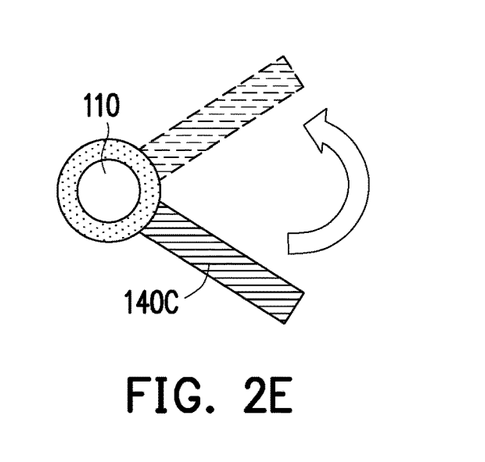

FIG. 2A is a schematic view of an actuating portion of the light detection module of FIG. 1A. FIG. 2B and FIG. 2C are a side schematic view and a front schematic view of another actuating portion of the light detection module of FIG. 1A. FIG. 2D and FIG. 2E are a side schematic view and a front schematic view of another actuating portion of the light detection module of FIG. 1A.

As shown in FIG. 2A, in this embodiment, the actuating portion 140 of the light detection module 100 may be a motor 140A. One end of the shaft portion 110 far away from the rod portion 120 is fixed on the motor 140A, and the motor 140A may be used to drive the shaft portion 110 to rotate. In this way, the rotation angle of the shaft portion 110 driven by the motor 140A may be automatically controlled by the control unit, so that the light detection module 100 may be switched between the first mode and the second mode.

Alternatively, as shown in FIG. 2B and FIG. 2C, in this embodiment, the actuating portion 140 of the light detection module 100 may be a roller 140B. The shaft portion 110 penetrates the roller 140B, and the shaft portion 110 is fixed to the roller 140B, and the shaft extension direction D110 is parallel to the direction of the central axis of the roller 140B. In this way, when the roller 140B rotates, the shaft portion 110 may be driven to rotate, so that the light detection module 100 may be switched between the first mode and the second mode.

Alternatively, as shown in FIG. 2D and FIG. 2E, in this embodiment, the actuating portion 140 of the light detection module 100 may be a rocker arm 140C. The shaft portion 110 is fixed to one end of the rocker arm 140C, and the shaft extension direction D110 is perpendicular to the extension direction of the rocker arm 140C. In this way, when the other end of the rocker arm 140C swings, the shaft portion 110 may be driven to rotate, so that the light detection module 100 may be switched between the first mode and the second mode.

In this way, through the structural configuration of the shaft portion 110 and the rod portion 120 of the light detection module 100, the light detection module 100 may be integrated on the display device 200 by switching between the first mode and the second mode, so that the user may detect the display image of the display device 200 according to the actual requirements. In addition, the light detection module 100 has a simple structure, so that the cost is low, and the thickness of the display device 200 is not affected, which is beneficial to the design of a thin display device 200.

Figures 3A, 3B:
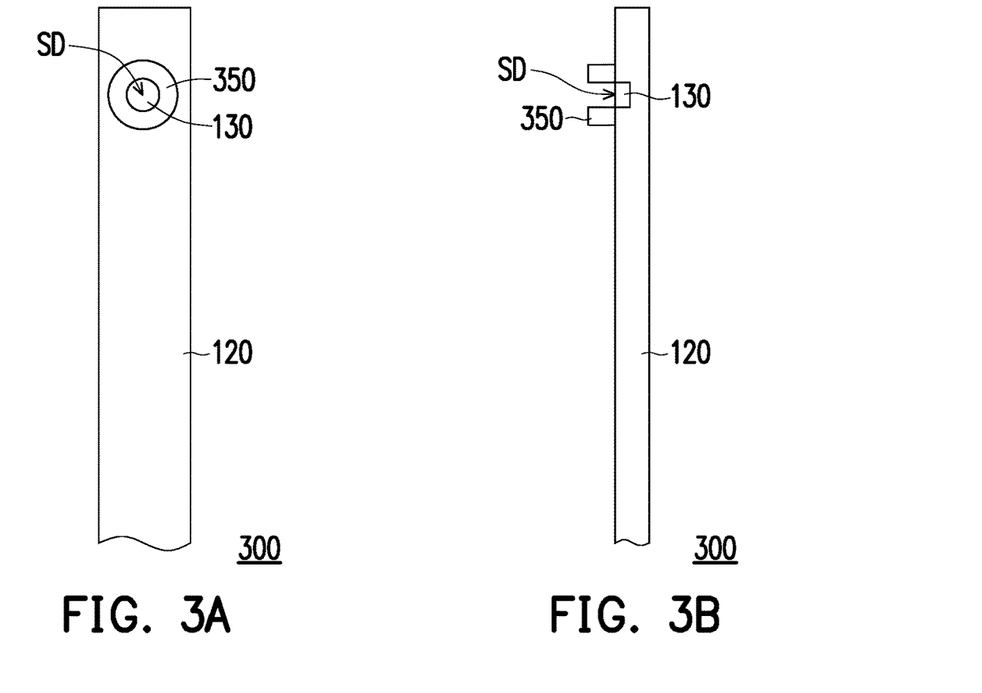
FIG. 3A and FIG. 3B are a front schematic view and a side schematic view of a light detection module according to another embodiment of the disclosure.

FIG. 3A and FIG. 3B are a front schematic view and a side schematic view of a light detection module according to another embodiment of the disclosure. Referring to FIG. 3A and FIG. 3B, in this embodiment, the light detection module 300 is similar to the light detection module 100 of FIG. 1A, and the differences between the two are as described below. In this embodiment, the light detection module 300 further includes a light shield 350, which is disposed on the rod portion 120 and surrounds the detection surface SD of the light detector 130, and protrudes relative to the detection surface SD. When the light detection module 300 is in the second mode, the light shield 350 is abutted against the display surface IM. In this way, when the light detection module 300 detects the display image of the display device 200, the light shield 350 may shield external stray light, thereby improving the accuracy of the light detection module 300. In particular, the material of the light shield 350 is, for example, a soft material (e.g., rubber, silicone, or sponge), which may improve the attaching nature of the light shield 350 when it is in contact with the display surface IM. Moreover, since the structure of the light detection module 300 is similar to the structure of the aforementioned light detection module 100, similar effects and advantages as the aforementioned light detection module 100 may also be achieved, which are not repeated herein. Moreover, when the light detection module 300 is adopted in the display device 200, the aforementioned effects and advantages may also be achieved, which are not repeated herein.

Figure 4:
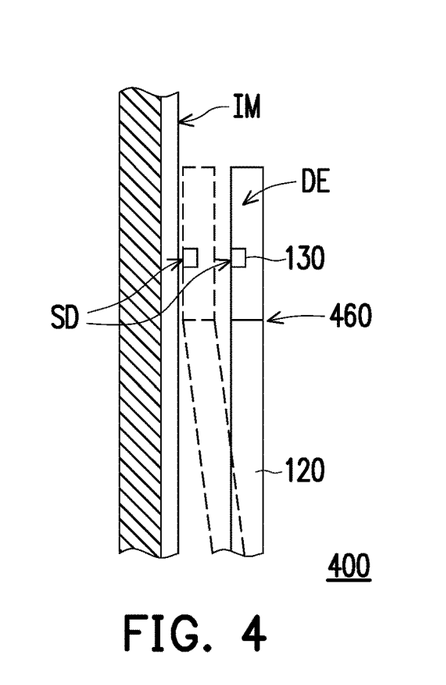
FIG. 4 is a side schematic view of a light detection module according to another embodiment of the disclosure.

FIG. 4 is a side schematic view of a light detection module according to another embodiment of the disclosure. Referring to FIG. 4, in this embodiment, the light detection module 400 is similar to the light detection module 100 of FIG. 1A, and the differences between the two are as described below. In this embodiment, the rod portion 120 further has a bending portion 460 located between the detection end portion DE and the connection end portion LE, and the bending portion 460 is, for example, formed of a flexible material or other structures that allows the rod portion 120 to bend. In this way, as shown in FIG. 4, when switching to the second mode, the shaft portion 110 may be rotated such that the bending portion 460 is bent. For example, in this embodiment, when the light detection module 400 is switched from the first mode to the second mode, the rotation angle of the rotation axis (the shaft portion 110) is greater than 180 degrees and less than 190 degrees. In this way, the bending portion 460 may be bent in the second mode, so that the connection end portion LE of the rod portion 120 is not parallel to the display surface IM, the detection end portion DE of the rod portion 120 is parallel to the display surface IM (i.e., the connection end portion LE is not parallel to the detection end portion DE in the second mode, and the connection end portion LE is, for example, parallel to the detection end portion DE in the first mode), and the detection end portion DE may be closely attached on the display surface IM (as shown in FIG. 4, in which the rod portion 120 shown in solid line indicates that the shaft portion 110 is rotated by 180 degrees; the rod portion 120 shown in dotted line indicates that the shaft portion 110 is rotated by more than 180 degrees) at the same time. In this way, when the light detection module 400 detects the display image of the display device 200, the external stray light is not easily detected by the detection end portion DE, thereby also improving the accuracy of the light detection module 400. Moreover, since the structure of the light detection module 400 is similar to the structure of the aforementioned light detection module 100, similar effects and advantages as the aforementioned light detection module 100 may also be achieved, which are not repeated herein. Moreover, when the light detection module 400 is adopted in the display device 200, the aforementioned effects and advantages may also be achieved, which are not repeated herein.

Figure 5:
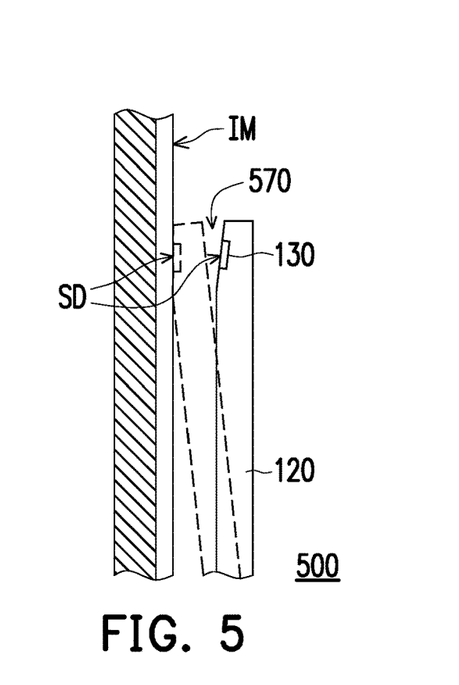
FIG. 5 is a side schematic view of a light detection module according to another embodiment of the disclosure.

FIG. 5 is a side schematic view of a light detection module according to another embodiment of the disclosure. Referring to FIG. 5, in this embodiment, the light detection module 500 is similar to the light detection module 200 of FIG. 1A, and the differences between the two are as described below. In this embodiment, the rod portion 120 of the light detection module 500 further has an chamfered portion 570, the light detector 130 is disposed on the chamfered portion 570 (i.e., the chamfered portion 570 is disposed on the detection end portion DE), and the detection surface SD of the light detector 130 is, for example, parallel to the inclined surface of the chamfered portion 570. In this way, when the light detection module 500 is switched from the first mode to the second mode, the rotation angle of the shaft portion 110 may also be greater than 180 degrees and less than 190 degrees, so that the inclined surface on the chamfered portion 570 may be closely attached to the display surface IM (as shown in FIG. 5, in which the rod portion 120 shown in solid line indicates that the shaft portion 110 is rotated by 180 degrees; the rod portion 120 shown in dotted line indicates that the shaft portion 110 is rotated by more than 180 degrees), similar effects and advantages as the light detection module 400 of FIG. 4 may also be achieved, which are not repeated herein. Moreover, when the light detection module 500 is adopted in the display device 200, the aforementioned effects and advantages may also be achieved, which are not repeated herein. In particular, in the embodiments of FIG. 4 and FIG. 5, the detection surface SD of the light detector 130 may be closely attached to the display surface IM by merely further increasing the rotation angle of the shaft portion 110. There is no need to further dispose other movement mechanisms to closely attach the detection surface to the display surface.

To sum up, in the display device and the light detection module according to an embodiment of the disclosure, through the structural configuration of the shaft portion and the rod portion of the light detection module, the light detection module may be integrated on the display device by switching between the first mode and the second mode, so that the user may detect the image screen of the display device according to the actual requirements. Especially when the included angle between the rod extension direction and the shaft extension direction is greater than 125 degrees and less than 165 degrees, the limitation of the frame width to the size of the light detector module may be reduced, and the light detector may be close to the central area of the display surface at the time. In addition, by disposing the light detection module on the frame of the display device, and by switching between the first mode and the second mode, the rod portion of the light detection module is swept above the display surface of the display device to change the included angle between the rod extension direction of the rod portion and the boundary with the display surface. Therefore when the light detection module is in the first mode, the display surface of the display device is not shielded, and viewing is not affected, and when the light detection module is in the second mode, the central area of the display surface that is relatively far away from the frame of the display device may be detected based on the length of the rod, so that the accuracy of the light detection module may be further improved. In addition, the light detection module has a simple structure, so that the cost is low, and the thickness of the display device is not affected, which is beneficial to the design of a thin display device.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A display device, comprising:
   a display panel, having a display surface; and
   a light detection module, used to detect an optical feature of the display surface, wherein the light detection module has a first mode and a second mode, and comprises:
   a shaft portion, having a shaft extension direction;
   a rod portion, having a rod extension direction, wherein the rod portion has a connection end portion and a detection end portion, and the connection end portion is fixed on the shaft portion and takes the shaft portion as a rotation shaft; and
   a light detector, located on the detection end of the rod portion,
   wherein the light detector has a detection surface,
   when the light detection module is in the first mode, the detection surface of the light detector is located at a first position, and the detection surface faces away from the display surface,
   when the light detection module is in the second mode, the detection surface of the light detector is located at a second position, and the detection surface faces the display surface,
   wherein an included angle between the rod extension direction and the shaft extension direction is an obtuse angle.

2. The display device according to claim 1, wherein a minimum distance from the second position to a boundary of the display surface is greater than a minimum distance from the first position to the boundary of the display surface.

3. The display device according to claim 1, wherein in the first mode and the second mode, the shaft extension direction is parallel to the display surface.

4. The display device according to claim 1, wherein the display device has a frame, the frame surrounds the display surface, the shaft portion is located at the frame, the frame has a frame width, a width of the rod portion is smaller than the frame width, and a length of the rod portion is greater than the frame width.

5. The display device according to claim 1, wherein the display device has a frame,
wherein the frame has an accommodating recess, and the rod portion is disposed in the accommodating recess.

6. The display device according to claim 1, wherein the display device has a frame,
wherein the shaft portion is installed on the frame.

7. The display device according to claim 1, wherein in the first mode, the rod extension direction is parallel to the boundary of the display surface, and in the second mode, the rod extension direction is perpendicular to the boundary of the display surface.

8. The display device according to claim 1, wherein when the shaft portion rotates, the rod portion rotates with the shaft portion as the rotation shaft, and a track surface formed by sweeping the rod portion is a portion of a solid cone surface.

9. The display device according to claim 1, wherein the light detection module further comprises:
a roller, wherein the shaft portion penetrates the roller, and the roller rotates to drive the shaft portion to rotate.

10. The display device according to claim 1, wherein the light detection module further comprises:
a rocker arm, wherein the shaft portion is fixed to one end of the rocker arm, and anther end of the rocker arm swings to rotate the shaft portion.

11. The display device according to claim 1, wherein the light detection module further comprises:
a motor, wherein one end of the shaft portion far away from the rod portion is fixed on the motor, and the motor is used to drive the shaft portion to rotate.

12. The display device according to claim 1, wherein when the light detection module is in the first mode, the light detection module enables the light detector to detect an ambient light.

13. The display device according to claim 1, wherein the light detection module further comprises:
a light shield, disposed on the rod portion and surrounds the detection surface of the light detector, and protrudes relative to the detection surface, wherein when the light detection module is in the second mode, the light shield is abutted against the display surface.

14. The display device according to claim 13, wherein when the light detection module is switched from the first mode to the second mode, a rotation angle range of the rotation axis is greater than 180 degrees and less than 190 degrees.

15. The display device according to claim 1, wherein the rod portion further has a bending portion located between the detection end portion and the connection end portion, and the bending portion is formed of a flexible material, wherein when the light detection module is in the second mode, the shaft portion is rotated to a position where the bending portion is bent and the detection end portion is attached to the display surface.

16. The display device according to claim 1, wherein the rod portion further has an chamfered portion, and the light detector is located on the chamfered portion.

* * * * *